United States Patent [19]
Gradin et al.

[11] Patent Number: 5,123,728
[45] Date of Patent: Jun. 23, 1992

[54] REAR SCREEN VIDEO PROJECTION SYSTEM FOR AIRCRAFT PASSENGER ENTERTAINMENT

[75] Inventors: James H. Gradin, Newport Beach; Donovan T. Nguyen, Laguna Hills, both of Calif.

[73] Assignee: Sony Trans Com, Inc., Irvine, Calif.

[21] Appl. No.: 672,048

[22] Filed: Mar. 18, 1991

[51] Int. Cl.$^5$ .................. G03B 21/28; G03B 21/60
[52] U.S. Cl. ........................... 353/78; 353/77; 353/13; 353/38; 359/456; 358/60
[58] Field of Search ............ 353/78, 77, 74, 12, 353/11, 79, 13, 38, 119, 98, 99; 358/60, 231; 350/127, 128; 359/454, 455, 456, 457

[56] References Cited

U.S. PATENT DOCUMENTS

| | | | |
|---|---|---|---|
| 3,457,006 | 7/1969 | Brown et al. | 353/13 |
| 3,462,214 | 8/1969 | Glenn, Jr. | 353/77 |
| 3,880,509 | 4/1975 | Herndon | 353/79 |
| 4,054,907 | 10/1977 | Itoh et al. | 358/60 |
| 4,352,124 | 9/1982 | Kline | 358/60 |
| 4,439,027 | 3/1984 | Shioda et al. | 353/77 |
| 4,482,206 | 11/1984 | Van Breemen | 359/455 |
| 4,639,106 | 1/1987 | Gradin | 353/13 |
| 4,701,020 | 10/1987 | Bradley, Jr. | 359/455 |
| 4,923,280 | 5/1990 | Clausen et al. | 359/455 |

FOREIGN PATENT DOCUMENTS 0338902  3/1936  Italy ........................... 353/12

Primary Examiner—William A. Cuchlinski, Jr.
Assistant Examiner—William C. Dowling
Attorney, Agent, or Firm—Blakely Sokoloff Taylor & Zafman

[57] ABSTRACT

A rear screen projection system integrated into the passenger cabin of an airplane. The system has a projector that directs a picture into the inner cavity of a housing. Also attached to the housing is a screen that has a first surface that faces the audience and a second opposite surface exposed to the inner cavity of the housing. Located between the projector and the housing is a mirror that reflects the picture from the projector onto the second surface of the screen. The screen is transparent to light so that the audience can view the picture on the first surface of the screen. The mirror is positioned such that the distance between the projector and the top and bottom edges of the screen are essentially equal. The mirror is also positioned such that even with an overhead projector, the incidence of light is normal to the screen and the picture is directed down toward the audience.

19 Claims, 3 Drawing Sheets

5,123,728

REAR SCREEN VIDEO PROJECTION SYSTEM FOR AIRCRAFT PASSENGER ENTERTAINMENT

BACKGROUND OF THE INVENTION

1. Field of the Invention

This invention relates to rear screen projection systems.

2. Description of Related Art

The first commercially available "big screen TV's" typically had a large screen and a projector that displayed a picture onto the screen. The projector typically reflected the picture off of the screen and into the audience. When used in an airplane, sunlight would come through the windows and also reflect off of the screen. This external light would tend to "wash out" the picture being displayed. The quality could only be improved by having the passengers pull down the window shades, a somewhat impractical method to use on a commercial airplane.

Another problem typically associated with large screen projection systems is that the top, center and bottom portions of the picture have different focusing requirements. This problem occurs because the projector is usually placed above the screen, wherein the distance between the projector and the bottom of the screen is longer than the distance between the projector and the top of the screen. Currently the picture is focused with a complex lens, which requires an undesirable length of time to focus the picture and install the system. One obvious solution is to place the projector in the center of the screen, such that the distance between the projector and the edges of the screen are the same. This is not practical because the projector would then be in the way of those behind the projector. Additionally, when installed on an airplane the projector could create an overhead protrusion which could be a safety hazard on the plane.

It has also been found that the picture quality improves when the incidence of light is perpendicular to the screen. With an overhead projection system the screen would have to be tilted toward the projector, creating a system that would direct the picture toward the ceiling instead of down into the audience. To create a system with a screen pointing downward, the projector would have to be on the floor. A floor mounted projector would take up valuable seating space and would be highly undesirable when used on an aircraft. Thus what is needed is a compact large screen projection system utilizing an overhead projector and a screen that displays a bright clear picture, that can be installed into the passenger cabin of an airplane.

SUMMARY OF THE INVENTION

The present invention is a rear screen projection system that can be integrated into the passenger cabin of an airplane. The system has a projector that directs a picture into the inner cavity of a housing. Also attached to the housing is a screen that has a first surface that faces the audience and a second opposite surface exposed to the inner cavity of the housing. The screen is located up near the ceiling of the cabin and preferably tilted to direct the picture down into the audience. Located between the projector and the housing is a mirror that reflects the picture from the projector onto the second surface of the screen. The screen is transparent to light so that the audience can view the picture on the first surface of the screen. The mirror is positioned such that the distance between the projector and the top and bottom edges of the screen are essentially equal, so that the top and bottom portions of the picture are equally focused. The mirror is also positioned such that even with an overhead projector, the incidence of light is normal to the screen and the picture is projected down toward the audience.

The projection system can have another mirror to fold the light and further reduce the size of the system. The second mirror reflects the picture from the first mirror onto the screen, such that the incidence of light is perpendicular to the screen and the outer edges of the light beam are of equal distance. The screen can have Fresnel lenses on the second surface to collimate the light from the mirrors and lenticular lenses on the first surface to widen the picture displayed by the screen. Opaque strips can be inserted between the lenticular lenses to reduce the reflection of external light directed onto the screen. The strips prevent the amount of washout caused by the sun in an airplane. Thus what is disclosed is projection system that is compact enough to install on an airplane, with superior focusing and brightness characteristics over systems known in the art.

Therefore it is an object of this invention to provide a projection system that is compact and can be installed on an airplane.

It is also an object of this invention to provide a projection system that produces an incidence of projected light that is normal to the screen without placing the projector in a position that will obstruct the view of the audience.

It is also an object of this invention to provide a projection system that produces a distance between the projector and both the top and the bottom edges of the screen that is essentially equal distance.

BRIEF DESCRIPTION OF THE DRAWINGS

The objects and advantages of the present invention will become more readily apparent to those skilled in the art after reviewing the following detailed description and accompanying drawings, wherein.

DETAILED DESCRIPTION OF THE INVENTION

Figure 1:
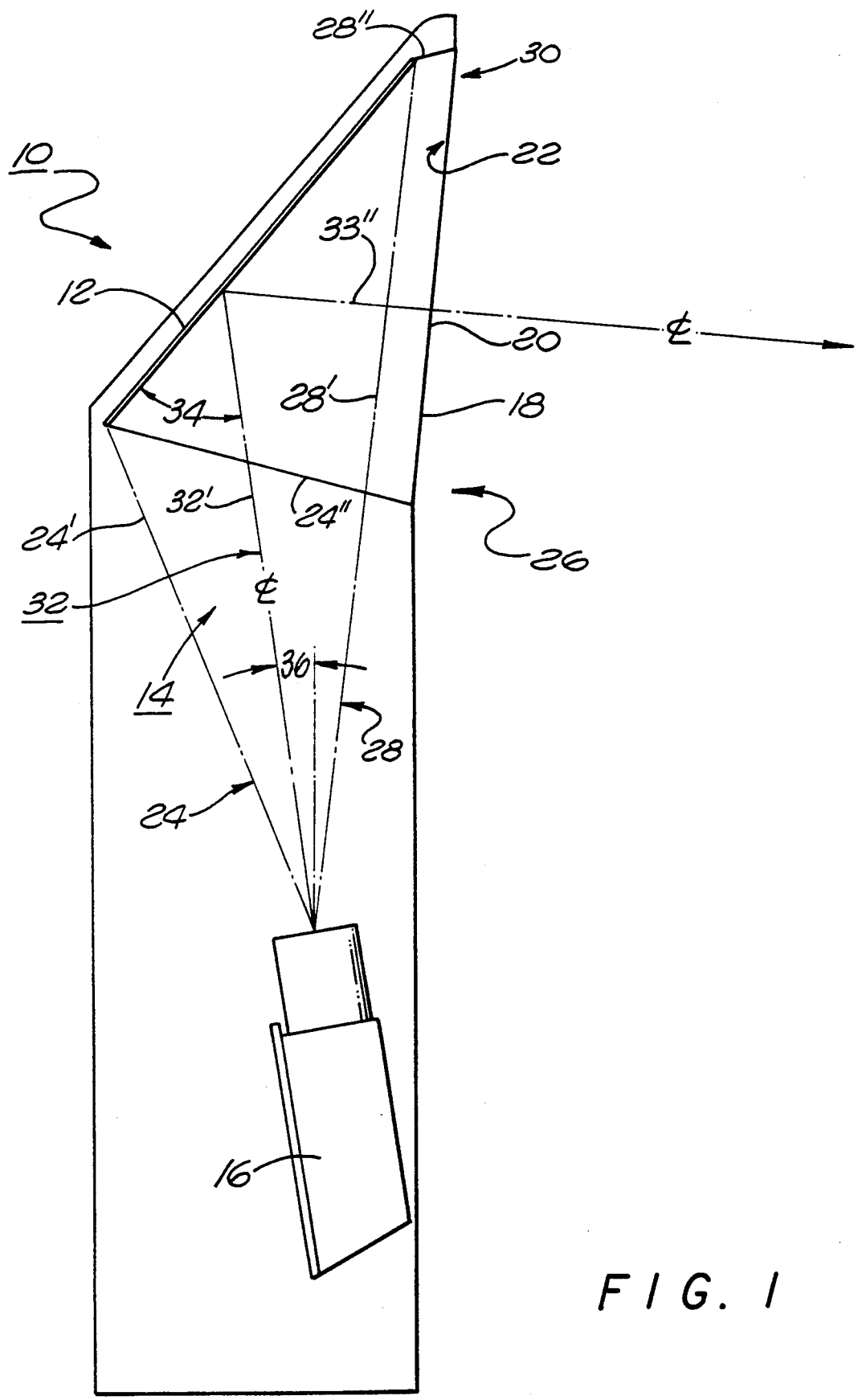
FIG. 1 is a side view of a rear screen projection system of the present invention, showing a single mirror that reflects a light beam from a projector onto a screen.

Referring to the drawings more particularly by reference numbers, FIG. 1 shows a projection system 10 of the present invention. The projection system 10 has a first mirror 12 that reflects a light beam 14 emitted by a projector 16 onto a screen 18. The projector 16 preferably displays color visual images, wherein the projector 16 will have three kinescopes that produce red, green and blue images, respectively. Such projectors are sold by Sony Corp. under the tradename Mark VI. The light beam 14 projected is typically a motion picture or other visual image. The screen 18 has a first surface 20 that is a viewing surface and a second opposite surface 22 facing the mirror 12. The screen 18 is transparent to light such that when the mirror 12 reflects the light beam 14 onto the screen 18, the light transmits through the screen 18 into the audience. One such type of screen is constructed from plastic and is sold by DAI Nippon Printing Co., Ltd. under the tradename ACRYLITE FR. The screen 18 may have a plurality of Fresnel lenses on the second surface 22. The Fresnel lenses collimate the light being reflected by the mirror 12 an increase the brightness of the light beam 14 displayed by the screen 18. The first surface 20 may have a plurality of vertically oriented lenticular lenses that direct the light along a more horizontal plane. Such a screen will typically create a horizontal viewing angle of ±160° and a vertical viewing angle of ±35°. This is particularly useful when used on an airplane where a large side to side viewing angle is desirable and a wide vertical beam is not required. The screen 18 may also have lines of opaque material between the lenticular lenses to absorb any light directed onto the first surface 20 from an external source. The opaque material prevents outside light from the sun or another light source from reflecting off of the first surface 20 and washing out the light being projected through the screen 18. This provides a brighter picture such that the projection system 10 can be used on a airplane, allowing the picture to be seen even when sunlight is shining through the windows of the plane.

The mirror 12 is located relative to the projector 16 and the screen 16 such that the distance of the first outer edge 24 of the light beam 14 between the projector 16 and the bottom 26 of the screen, is approximately equal to the distance of the second outer edge 28 between the projector 16 and the top 30 of the screen 18. That is, the sum of the distances of the first outer edge 24 between the projector 16 and the mirror, (24'), and between the mirror 12 and the bottom 26 of the screen, (24"), is approximately equal to the sum of the distances of the second outer edge 28 between the projector 16 and the mirror, (28'), and the mirror and the screen, (28"). Creating distances between the projector and the top 26 and bottom 30 of the screen that are equal provides a better overall focus of the picture on the screen 18. As previously discussed, when the projector 16 is above the screen, the distance between the projector and the top of the screen is shorter than the distance from the projector to the center and bottom of the screen. Typically with overhead projectors the center of the screen is focused and the top and bottom of the picture is slightly out of focus, because the beam length from the projector to the top, center and bottom portions of the screen are all different. To correct this problem, a lens has to be used that separately focuses the top, bottom and center segments of the picture. By equaling the distance of the outer edges of the screen, this distortion is greatly reduced so that separate focusing is not required. Although the center of the screen is still less distance from the projector than the edges, this distance is cut in half from prior overhead projector systems and produces a picture of improved quality over systems presently found in the art.

Figure 2:
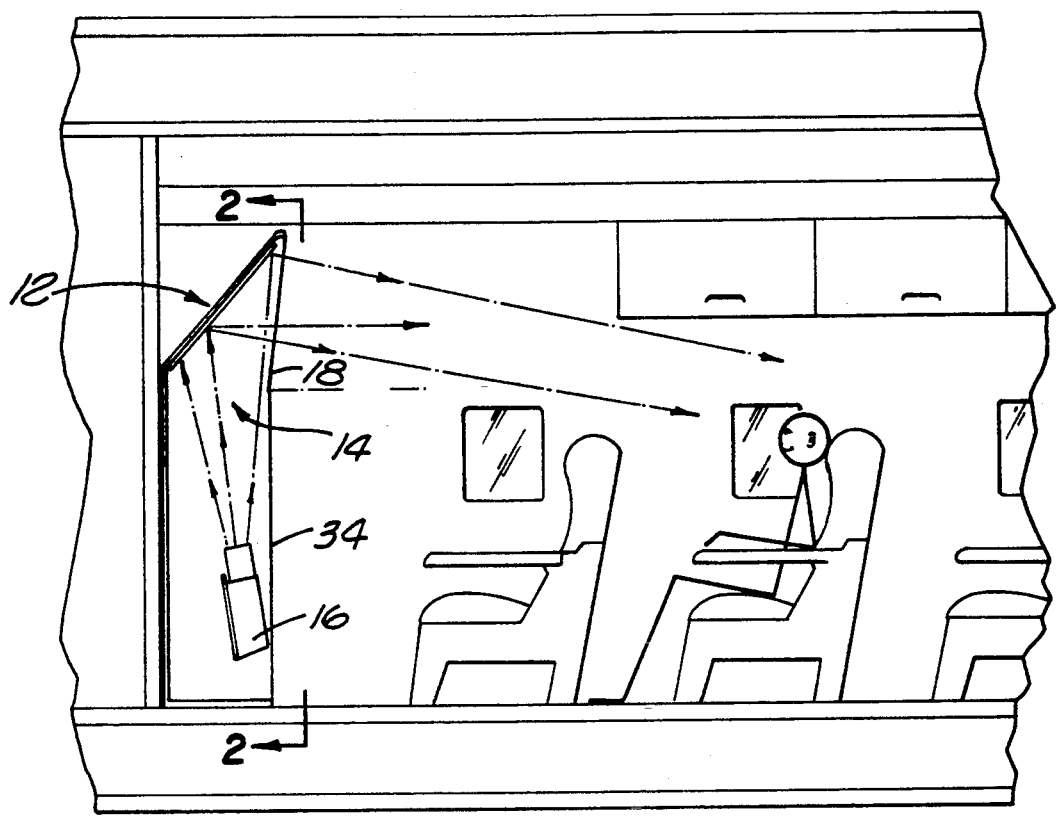
FIG. 2 is a side view of the rear screen projection system of FIG. 1 installed into the passenger cabin of an airplane.
Figure 3:
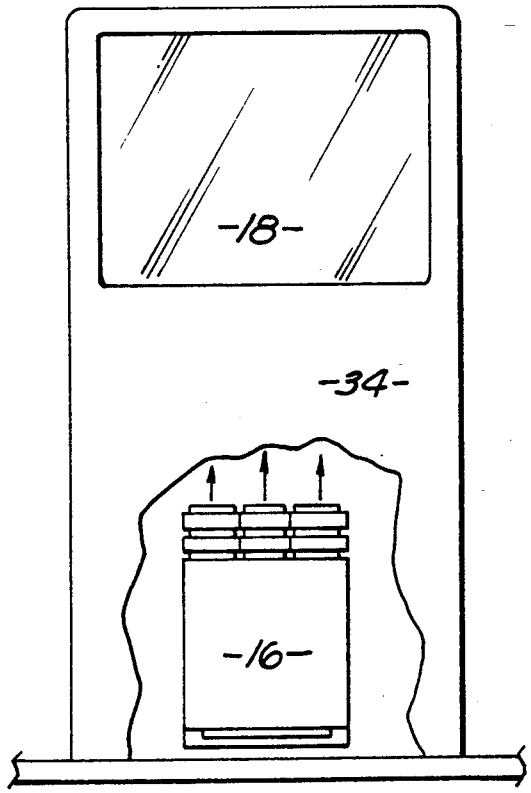
FIG. 3 is a front view of the rear screen projection taken at line 2—2 of FIG. 2.

The mirror 12 should be oriented with respect to the projector 16 and screen 18, such that the centerline 32 incidence of light is essentially perpendicular to the screen 18. It has been found that such an arrangement produces a higher quality picture. As a representative embodiment, the system may have a vertical screen approximately 40 inches in diagonal and a throw distance of 46 inches. The throw distance being defined as the distance between the projector and the center of the screen, such that the outer beam edges shine on the edges of the screen. That is, the picture is no larger or smaller than the screen. The centerline beam distance 32' between the projector and the mirror is approximately 34 inches, the distance 32" between the mirror and the screen is approximately 12 inches. The angle 32A between the mirror 12 and the beam centerline 32 being approximately 50 degrees and the angle 32B between the centerline of the beam and a vertical axis being approximately 8 degrees. Although a 40 inch screen with accompanying dimensions have been shown and described, it is to be understood that a variety of different size screens, throw distances, projector and screen angles can be employed. The mirror 12, projector 16 and screen 18 can all be attached to a housing 34 to create a video module. The housing 34 prevents outside light from shining off the mirror and allows the module to be easily moved and installed. FIGS. 2 and 3 show a module integrated into the passenger cabin 36 of an airplane.

Figure 4:
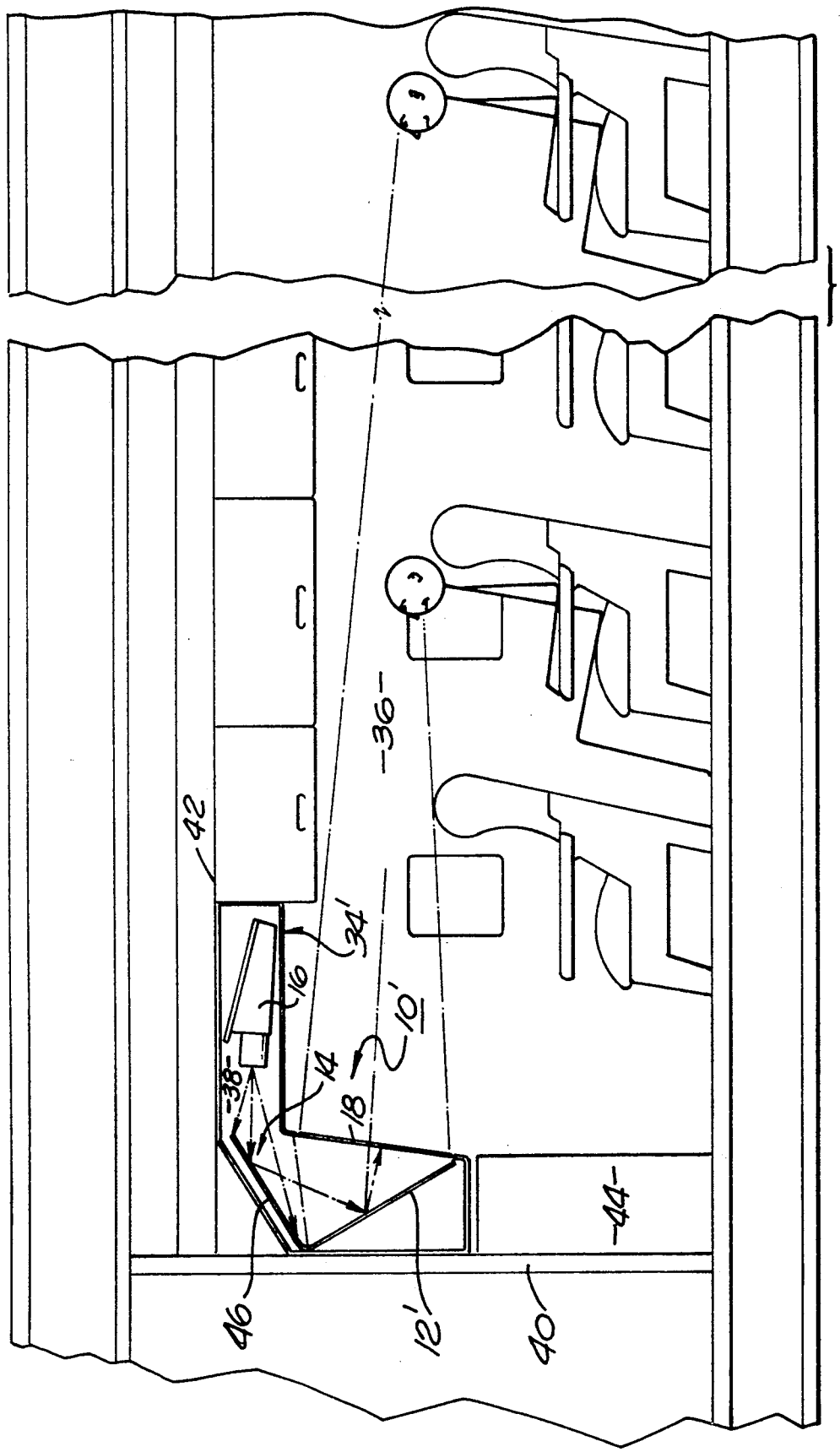
FIG. 4 is a side view of a rear screen projection system installed in an airplane with two mirrors that reflect a light beam onto a screen.

FIG. 4 shows another embodiment of a projection system 10' installed in the passenger cabin 36 of an airplane. The system 10' has a housing 34' with an inner cavity 38. The housing 34' is attached to a wall 40 in the cabin 36, such walls typically being constructed in planes to separate seating sections such as first class and coach. The housing 34' can also be attached to the ceiling 42 of the cabin 36. As shown the projector 16 is mounted within the housing 34' adjacent the ceiling 42, to provide room below the system 10' for another component 44 such as a bar or a storage rack for luggage. Such an arrangement greatly improves the space efficiency of the cabin 36, which is very important on an airplane. First 12' and second 46 mirrors are attached to the housing 34' within the inner cavity 38 to reflect the light beam 14 from the projector 16 onto the screen 18. The second mirror 46 folds the light a second time to reduce the distance between the projector 16 and screen 18, without changing the throw distance of the light beam 14. This provides a highly compact projection system that does not use up valuable space within the cabin 36. The mirrors are again located and oriented relative to the projector 16 and screen 18, such that the outer beam edges are of equal distance and the centerline of the light is normal to the screen 18. The screen can be installed at an angle oblique to the floor, so that the picture is projected down into the audience as shown in FIG. 4. The mirrors are adjusted accordingly such that the beam edges are equal and the centerline is still normal to the screen. The present construction provides a projection system that has a screen 18 facing down toward the audience, while still utilizing an overhead projector 16 in an arrangement that until now was not found in the art. The location, tilt angle and width of the screen 18, should be such that the maximum brightness occurs at the center of the cabin 36. This requires that the centerline 32 of light that is perpendicular to the screen 18, be directed to the center of the cabin 36. As shown in FIGS. 1 and 2, the projection system 10 of the first embodiment may also have a tilted screen 18, so that the maximum brightness occurs at the center of the cabin. The screen 18 should also be located such that a viewer in the aft portion of the cabin 36 can see the top of the screen 18, and viewers in the fore portion of the cabin 36 can see the bottom of the screen 18 as shown in FIG. 4.

The screen 18 of the second embodiment may again have Fresnel lenses on the second surface and lenticular lenses on the first surface to collimate and focus the light. The screen 18 may further have opaque strips between the lenticular lenses to prevent the picture from being washed out by external light. Thus what is provided is a projection system having an improved picture quality because of the equal beam edges, normal centerline and high fidelity screen, arranged in a compact overhead module that can be easily installed and used in the passenger cabin of an airplane. To this date there has not been a compact large screen video display unit in an aircraft that will produce the quality of picture produced by this system.

While certain exemplary embodiments have been described in detail and shown in the accompanying drawings, it is to be understood that such embodiments are merely illustrative of, and not restrictive on the broad invention, and that this invention not be limited to the specific constructions and arrangements shown and described since various other modifications may occur to those ordinarily skilled in the art.

What is claimed is:

1. A rear screen projection system, comprising:
   a projector that projects a beam of light, said light beam having a first and second outer edge;
   a screen adapted to display said light beam, said screen having a top and bottom edge, wherein said first outer edge of said light beam is illuminated at said top edge of said screen and said second outer edge of said light beam is illuminated at said bottom edge of said screen; and,
   at least one mirror located between said projector and said screen that reflects said light beam from said projector onto said screen such that the distance of said first outer edge of said light beam between said projector and said top edge of said screen is approximately equal to the distance of said second outer edge of said light beam between said projector and said bottom edge of said screen.

2. The projection system as recited in claim 1, wherein the rear screen projection system has a first mirror that reflects said light beam from said projector and a second mirror that reflects said light beam from said first mirror onto said screen, said mirrors being located such that the distance of said first outer edge of said light beam between said projector and said top edge of said screen is approximately equal to the distance of said second outer edge of said light beam between said projector and said bottom edge of said screen.

3. The projection system as recited in claim 1, further comprising a housing, wherein said screen is attached to said housing such that a first surface of said screen is viewable by an audience and a second surface of said screen is facing said mirror which is attached to said housing 4. The projection system as recited in claim 1, wherein said screen has a first surface viewable by an audience with a plurality of lenticular lenses and a second opposite surface with a plurality of Fresnel lenses.

5. The projection system as recited in claim 4, wherein said first surface of said screen has means for reducing the amount of light reflected from said first surface from a light source external to said housing.

6. A rear screen projection system constructed to display visual images to an audience, comprising:
   a housing having an inner cavity;
   a projector attached to said housing that projects a beam of light, said light beam having a first and second outer edge;
   a screen attached to said housing such that a first surface of said screen is viewable by the audience, said screen further having a second opposite surface and a top and bottom edge, wherein said first outer edge of said light beam is illuminated at said top edge of said screen and said second outer edge of said light beam is illuminated at said bottom edge of said screen, said first surface of said screen having a plurality of lenticular lenses and said second surface of said screen having a plurality of Fresnel lenses; and,
   at least one mirror attached to said housing within said inner cavity, said mirror being located between said projector and said screen to reflect said light beam from said projector onto said screen such that the distance of said first outer edge of said light beam between said projector and said top edge of said screen is approximately equal to the distance of said second outer edge of said light beam between said projector and said bottom edge of said screen.

7. The projection system as recited in claim 6, wherein the rear screen projection system has a first mirror that reflects said light beam from said projector and a second mirror that reflects said light beam from said first mirror onto said screen, said mirrors being located such that the distance between said projector and said top edge of said screen of said first outer edge of said light beam is approximately equal to the distance of said second outer edge of said light beam between said projector and said bottom edge of said screen.

8. The projection system as recited in claim 6, wherein said first surface of said screen has means for reducing the amount of light reflected from said first surface from a light source external to said housing.

9. A rear screen projection system that displays visual images to an audience, the system being integrated into a passenger cabin of an airplane that has a ceiling and a floor, comprising:
   a housing adjacent the ceiling of the passenger cabin, said housing having an inner cavity;
   a projector connected to said housing that projects a beam of light, said light beam having a first and a second outer edge;
   a screen attached to said housing spaced a predetermined distance from the floor of the passenger cabin, said screen having a first surface of said screen that is viewable by the audience, a second opposite surface and a top and bottom edge, wherein said first outer edge of said light beam is illuminated at said top edge of said screen and said second outer edge of said light beam is illuminated at said bottom edge of said screen; and,
   at least one mirror attached to said housing within said inner cavity, said mirror being located between said projector and said screen to reflect said light beam from said projector onto said screen such that the distance of said first outer edge of said light beam between said projector and said top edge of said screen is approximately equal to the distance of said second outer edge of said light beam between said projector and said bottom edge of said screen.

10. The projection system as recited in claim 9, wherein the rear screen projection system has a first mirror that reflects said light beam from said projector and a second mirror that reflects said light beam from said first mirror onto said screen, said mirrors being located such that the distance between said projector and said top edge of said screen of said first outer edge of said light beam is approximately equal to the distance of said second outer edge of said light beam between said projector and said bottom edge of said screen.

11. The projection system as recited in claim 9, wherein said first surface of said screen has a plurality of lenticular lenses and said second surface of said screen has a plurality of Fresnel lenses.

12. The projection system as recited in claim 11, wherein said first surface of said screen has means for reducing the amount of light reflected from said first surface from a light source external to said housing.

13. A rear screen projection system that displays visual images to an audience, the system being integrated into a passenger cabin of an airplane that has a ceiling and a floor, comprising:
    a housing adjacent the ceiling of the passenger cabin, said housing having an inner cavity;
    a projector connected to said housing that projects a beam of light, said light beam having a first and a second outer edge;
    a screen attached to said housing spaced a predetermined distance from the floor of the passenger cabin, said screen having a first surface of said screen that is viewable by the audience, a second opposite surface and a top and bottom edge, wherein said first outer edge of said light beam is illuminated at said top edge of said screen and said second outer edge of said light beam is illuminated at said bottom edge of said screen, said first surface of said screen having a plurality of Fresnel lenses and said second surface of said screen having a plurality of lenticular lenses; and,
    a first and a second mirror attached to said housing within said inner cavity, said first and second mirrors being located between said projector and said screen such that said first mirror reflects said light beam from said projector to said second mirror and said second mirror reflects said light beam from said first mirror onto said screen, said mirrors reflect said light beam such that the distance of said first outer edge of said light beam between said projector and said top edge of said screen is approximately equal to the distance of said second outer edge of said light beam between said projector and said bottom edge of said screen.

14. The projection system as recited in claim 13, wherein said first surface of said screen has means for reducing the amount of light reflected from said first surface from a light source external to said housing.

15. The screen as recited in claim 14, wherein said screen is attached to said housing such that said first surface is at an angle oblique to the floor, whereby said light beam is directed in a downward direction toward the audience.

16. A rear screen projection system located within a passenger cabin of an airplane, the passenger cabin having a passenger area partially defined by a floor and a ceiling, comprising:
    an L shaped housing having a first portion adjacent to the ceiling and a second portion that extends from said first portion toward the floor;
    a projector that projects a beam of light, said projector being located within said first portion of said housing;
    a screen attached to said second portion of sad housing, such that said screen is viewable from the passenger area;
    a first mirror that directs said beam of light from said projector to said second portion of said housing; and,
    a second mirror that directs said beam of light from said first mirror to said screen;
    wherein said beam of light has first and second outer edges, said first and second mirror being located such that the length of said first outer edge from said projector to a top edge of said screen is approximately equal to the length of said second outer edge from said projector to a bottom edge of said screen.

17. The projection system as recited in claim 16, wherein a first surface of said screen has a plurality of lenticular lenses and a second opposite surface of said screen has a plurality of fresnel lenses.

18. The projection system as recited in claim 17, wherein said first surface of said screen has means for reducing the amount of light from an external source that is reflected from said screen.

19. The projection system as recited in claim 16, wherein said screen is attached to said housing at an angle oblique to the floor of the passenger cabin, such that said light beam is directed in a downward direction toward the passenger area.

* * * * *

UNITED STATES PATENT AND TRADEMARK OFFICE
CERTIFICATE OF CORRECTION

PATENT NO. : 5,123,728
DATED : June 23, 1992
INVENTOR(S) : Gradin, et al.

It is certified that error appears in the above-identified patent and that said Letters Patent is hereby corrected as shown below:

In column 5 at line 57 insert --.-- after "housing"

Signed and Sealed this

Seventh Day of December, 1999

Attest:

Q. TODD DICKINSON

*Attesting Officer*     *Acting Commissioner of Patents and Trademarks*